US011233999B2

(12) United States Patent
Akester

(10) Patent No.: US 11,233,999 B2
(45) Date of Patent: Jan. 25, 2022

(54) TRANSMISSION OF A REVERSE VIDEO FEED

(71) Applicant: DisplayLink (UK) Limited, Cambridge (GB)

(72) Inventor: Richard Akester, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 16/955,613

(22) PCT Filed: Dec. 14, 2018

(86) PCT No.: PCT/GB2018/053640
§ 371 (c)(1),
(2) Date: Jun. 18, 2020

(87) PCT Pub. No.: WO2019/122829
PCT Pub. Date: Jun. 27, 2019

(65) Prior Publication Data
US 2020/0389649 A1 Dec. 10, 2020

(30) Foreign Application Priority Data
Dec. 19, 2017 (GB) ...................................... 1721274

(51) Int. Cl.
*H04N 19/132* (2014.01)
*H04N 19/14* (2014.01)
(Continued)

(52) U.S. Cl.
CPC ........... *H04N 19/132* (2014.11); *G06F 3/012* (2013.01); *G06T 7/20* (2013.01); *G06T 9/004* (2013.01);
(Continued)

(58) Field of Classification Search
None
See application file for complete search history.

(56) References Cited

U.S. PATENT DOCUMENTS 10,242,501 B1 * 3/2019 Pusch .................... H04N 19/43
2002/0054032 A1 * 5/2002 Aoki ..................... H04N 19/30
345/204

(Continued)

FOREIGN PATENT DOCUMENTS

| WO | 2015176163 A1 | 11/2015 |
| WO | 2017030985 A1 | 2/2017 |
| WO | 2017061890 A1 | 4/2017 |

OTHER PUBLICATIONS

Search Report for International Application No. GB1721274.7, dated Jun. 22, 2018, 6 pages.

*Primary Examiner* — Kate H Luo
(74) *Attorney, Agent, or Firm* — Paradice & Li LLP

(57) ABSTRACT

A method implemented in a Virtual or Augmented Reality (VR/AR) system having a display device (112) associated with a user (110) and a central control device (116) involves capturing a video feed from a camera (126) associated with the user (110) or the display device (112), the video feed recording changes in the position of the user (110) in a physical space, compressing the video feed from the camera (126), and transmitting the compressed video feed to the central control device (116) to enable the central control device (116) to determine movement of the user (110) within the physical space.

19 Claims, 7 Drawing Sheets

(51) Int. Cl.
*H04N 19/174* (2014.01)
*H04N 19/63* (2014.01)
*G06F 3/01* (2006.01)
*G06T 7/20* (2017.01)
*G06T 9/00* (2006.01)
*G06T 19/00* (2011.01)

(52) U.S. Cl.
CPC ........... *G06T 19/003* (2013.01); *H04N 19/14* (2014.11); *H04N 19/174* (2014.11); *H04N 19/63* (2014.11)

(56) References Cited

U.S. PATENT DOCUMENTS

| | | | |
|---|---|---|---|
| 2002/0057737 A1* | 5/2002 | Lehtonen | H04N 5/232 375/240 |
| 2008/0261693 A1 | 10/2008 | Zalewski | |
| 2011/0026591 A1* | 2/2011 | Bauza | G06T 9/00 375/240.12 |
| 2011/0140994 A1* | 6/2011 | Noma | G02B 27/017 345/8 |
| 2011/0213664 A1* | 9/2011 | Osterhout | G06F 3/013 705/14.58 |
| 2012/0249590 A1* | 10/2012 | Maciocci | G06T 15/503 345/633 |
| 2013/0170557 A1* | 7/2013 | Wang | G06T 7/11 375/240.24 |
| 2014/0132602 A1 | 5/2014 | Raghoebardayal et al. | |
| 2014/0161367 A1* | 6/2014 | Ridenour | H04N 19/115 382/233 |
| 2015/0242414 A1 | 8/2015 | Starner et al. | |
| 2016/0112718 A1* | 4/2016 | Sakata | H04N 19/12 382/233 |
| 2017/0201757 A1* | 7/2017 | Goldman | H04N 19/46 |
| 2017/0227765 A1 | 8/2017 | Mammou et al. | |
| 2017/0302918 A1* | 10/2017 | Mammou | H04N 19/162 |
| 2018/0035126 A1* | 2/2018 | Lee | G06F 21/53 |
| 2018/0063538 A1* | 3/2018 | Bernal | H04N 19/103 |
| 2019/0028721 A1* | 1/2019 | Rutschman | H04N 19/33 |
| 2019/0238861 A1* | 8/2019 | D'Acunto | H04N 21/21805 |

* cited by examiner

TRANSMISSION OF A REVERSE VIDEO FEED

CROSS-REFERENCE TO RELATED APPLICATIONS

This application is a National Stage Entry filed under 35 U.S.C. § 371 of PCT/GB2018/053640, filed Dec. 14, 2018, which claims priority to Great Britain Application No. 1721274.7, filed Dec. 19, 2017, all of which are assigned to the assignee hereof. The disclosures of all prior Applications are considered part of and are incorporated by reference in this Patent Application.

This application is a U.S. national stage entry of PCT Application No. PCT/GB2018/053640, filed Dec. 14, 2018, which claims priority to, and the benefit of, GB1721274.7, filed Dec. 19, 2017, the disclosures of which is expressly incorporated herein by reference in their entireties.

The invention relates to an improved method of transmitting image data, in particular video data in a Virtual Reality or Augmented Reality (VR/AR) system. In a particular embodiment the image data is data from a reverse video feed transmitted from a user display device to a central control device across a wireless link.

In a VR/AR system, a camera is often provided with the user's headset or display device in order to track the movement of the user within their physical space. The video feed from the camera is transmitted back to a central control device such as a display controller, computer, games terminal or host system, which processes this reverse video feed to determine how the user is moving within physical space. Movement of the user can be determined, for example by tracking the apparent movement of static objects such as the edge of a window or television within the reverse video feed. This information can then be converted into movement in the virtual space by the central control device.

In alternative embodiments, a camera may be arranged such that the user is within its field of view. In this case, movement of the user can be monitored and observed directly by the camera, with the video feed also being transmitted back to the central control device for processing.

Overview

There is provided herein a method implemented in a Virtual or Augmented Reality (VR/AR) system comprising a display device associated with a user and a central control device, the method comprising capturing a video feed from a camera associated with the user or the display device, the video feed recording changes in the position of the user in a physical space; compressing the video feed from the camera; and transmitting the compressed video feed to the central control device to enable the central control device to determine movement of the user within the physical space.

An important consideration in designing a VR/AR system is to enable the efficient use of bandwidth between a display device associated with a user, such as a headset worn by the user, and the central control device that generates the video and audio feed for the user. This link is increasingly provided as a wireless link so the management of the bandwidth on the link is critical to ensuring a good user experience. It is useful to use a video feed from a camera associated with the user or display device in order to track movement of the user within the physical space, so that this movement can be mapped onto movement in the virtual reality space by the central control device. However, transmission of this reverse video feed back from the camera consumes bandwidth over the link to the central control device and this reduces the bandwidth available for the transmission of the main VR/AR information to the display device. The inventors have therefore appreciated that, while compression of the reverse video feed adds a further processing step, it advantageously reduces the bandwidth needed for the system to track movement of the user within the physical space and is therefore advantageous for the system as a whole.

In preferred embodiments, compressing the video feed comprises compressing using a compression technique that does not reduce the definition of edges or image features in the video feed.

It has been further appreciated by the inventors that, although compression of the reverse video feed can be used to reduce the bandwidth used for the feed over the link between the display device and the central control device, compression methods can reduce the usefulness of this feed, for example by blurring the edges being used for the tracking of movement within the physical space. However, compressing the reverse video feed using a compression algorithm that does not reduce the definition of edges in the compressed video data maintains the information that is important in the reverse video feed; that is, the edges against which movement of the user can be assessed and measured. In this way, a reverse video feed can be compressed, advantageously reducing the bandwidth consumed by the feed, but without detracting significantly from the usefulness of the feed in determining movement of the user around the physical space.

Edges and image features using which the movement of a user can be tracked and monitored include any discrete and distinct features that remain stationary within the physical space while the user moves around. Sharp edges with high contrast within the image can be particularly useful in movement tracking, for example the edge of a television, picture, other item of furniture, window or picture on the wall. In one embodiment, markers may be placed into the physical environment for the camera to track. For example, QR codes or known monochrome patterns can be printed and displayed around the user's environment, for example fixed to the walls of the room in which the user is positioned. For an outside-in tracking system (as described below), QR codes or other tracking patterns can be fixed to the user; either on a headset being worn by the user or on other parts of the user's body.

Optionally, compressing the video feed comprises encoding the video feed using a wavelet-based encoding technique or a discrete wavelet transform. Wavelet-based encoding or encoding using discrete wavelet transforms enables compression of the video feed without losing features such as edges that can be useful in accurately tracking movement of the user. Some encoding techniques can be used to emphasise the presence and position of edges in the video feed. However, encoding techniques include Discrete Cosine Transformation (DCT) techniques such as JPEG or HEVC, or Haar encoding using Haar transforms will tend to lose edge information either in data transform steps or during quantisation.

The presence of large high-frequency AC coefficients indicates interesting features in a tile. However, that information is lost as the compression ratio increases and edges are particularly sensitive to compression. As described in more details below, if non-interesting tiles are discarded, tiles that have been determined to include edges can be sent without compression, with a significant amount of compression being achieved simply from the tiles that are discarded.

In a particular embodiment, high-frequency AC values in the luma or luminance plane are used to provide an indication of an edge. These values are preserved so that only tiles that include the high-frequency AC values are sent. The GPU-side algorithm can then make a decision with regard to whether the data represents an edge or not and form curved-line segments using this data accordingly.

Optionally, transmitting the compressed video feed comprises identifying at least one tile in a frame of the video feed that includes an edge or image feature and selectively transmitting the data associated with the at least one tile. Hence data for tiles that contain features that are useful for position tracking is compressed and transmitted over the wireless link while data for tiles that are less useful in tracking the position of the user, for example because they are uniform and do not contain features of interest, are not transmitted.

One embodiment further comprises identifying that at least one tile in a frame of the video feed includes an edge or image feature, storing an identifier of the at least one tile and selectively transmitting the corresponding tile of the next frame of the video feed.

Compression and transmission of tiles that previously contained the image feature can be useful for continuity of movement tracking of the user, even though the image feature has moved to fall within a different tile.

In general, the method can include transmitting the compressed video feed comprises identifying data representing edges and image features in the video feed and selectively transmitting the identified data. For example, the system may simply transmit the compressed data that indicates a discontinuous feature, for example the high-frequency components in a DCT compression system.

In one particular embodiment, the video feed is transformed into luminance and chrominance components and wherein compressing the video feed comprises discarding the chrominance components. The luminance component alone can be sufficient to identify edges or discontinuous features in the video feed from the tracking camera. Therefore simply separating this from the chrominance information (for example using RCT luma, chrominance space or separating the "Y" luminance values from a YUV space representation) can be sufficient to enable movement tracking while reducing the amount of data in the reverse video feed, effectively compressing this video feed.

In some embodiments, the luminance component of the video feed may itself be further compressed.

One method of identifying edge features in the image is to determine where there are sharp changes in the luminance value or brightness in the input image. Pixels or tiles that include sharp changes in value can be identified as parts of the image that include edge features that may be helpful in movement tracking. Sharp-changing pixels are grouped into curved-line segments that define the edges. Similarly, in colour space, discontinuities in the colour values of pixels can be used to identify edges of interest and the tiles and pixels that contain them.

One embodiment comprises monitoring changes in a compression ratio as successive tiles of each frame of the video feed are compressed. Changes in the compression ratio from tile-to-tile can provide information about how complex the video data within that tile is and therefore how interesting it might be for the purpose of position tracking.

The compression ratio is the ratio between the size of the uncompressed data and the compressed data. A high compression ratio indicates that the compressed data is much smaller in size than the uncompressed data and a high degree of compression has therefore been achieved. This indicates, for example, that the tile being compressed is relatively uniform and does not contain interesting image features.

Conversely, a low compression ratio occurs when there is little compression of the image and can indicate that there are discontinuous features in the tile that are not easily compressed. Such features may be useful in tracking the movement of the user.

Optionally, the method comprises discarding the data for tiles for which the compression ratio is greater than a predetermined threshold. As noted above, highly-compressed tiles are unlikely to contain image features useful for motion tracking and therefore can be discarded prior to transmission to the central control unit, saving bandwidth on the link between the central control unit and the display device.

Optionally, the method includes decreasing the level of compression of tiles for which the compression ratio is less than a predetermined threshold. That is, once the compression ratio has been used to determine which tiles are likely to be most interesting, the data within those tiles may be compressed to a lesser degree than other tiles, to ensure that the interesting features are not lost in the compression. In some embodiments, uncompressed data may be transmitted for those selected tiles.

In a particular embodiment, an uncompressed version of tiles with a low compression ratio is transmitted, while tiles with a high compression ratio are compressed and encoded to minimise the bandwidth necessary for transmission of those tiles over the wireless link.

Useful parameters in determining whether the tile contains features of interest include the length of the compression coefficient or the length of the compressed output. However, it is better to identify tiles of interest before the compression process is complete so that processing power is not wasted on compressing tiles that do not need to be sent and so that the processing method can be adapted depending on which tiles are determined to be of interest during the processing.

In preferred embodiments, changes in the compression ratio are monitored prior to an entropy encoding step of the compression, optionally prior to a quantisation step of the compression. Early identification of changes in the compression ratio can reduce wasted processing of tiles that will not be transmitted or can help to guide the level of compression for particular tiles at an early stage. This can avoid wasted processing of tiles.

In one embodiment, the camera is mounted on the user, and the field of view of the camera looks away from the user. In such an "inside-out" camera arrangement, the field of view of the camera is the physical environment in which the user is positioned.

Optionally, the camera is integrated into the display device associated with the user. For example, the camera may be integrated into the user headset.

In an alternative embodiment, the camera is mounted on a device separate from the user and the field of view of the camera includes the user. In such an embodiment, the camera may track movement of the user directly, for example based on a marker worn by the user. This would be an "outside-in" camera arrangement.

In some embodiments, there may be more than one camera tracking movements of the user, for example in an "outside-in" arrangement, more than one camera would be particularly useful in tracking the movement of a user in three dimensions.

Optionally, the video feed from the camera is compressed using a processor at the camera or at the display device associated with the user.

The video feed from the camera may be transmitted to the central control device over a two-way communication link, wherein at least a portion of the two-way communication link is also used to transmit VR/AR video data from the central control device to the user display device.

Optionally, transmitting the compressed video feed comprises transmitting the compressed video feed over a wireless connection between the central control device and the user display device.

One embodiment includes a further step of transforming the video feed into a monochrome image, optionally a black and white or greyscale image, prior to compressing the video feed. This reduces the amount of data that needs to be compressed while maintaining the important contrast information useful to identify edges.

There is also described herein a Virtual or Augmented Reality (VR/AR) system comprising a display device associated with a user and a central control device. The system includes a camera associated with the user or the display device for capturing a video feed, the video feed recording changes in the position of the user in a physical space, means for compressing the video feed from the camera and means for transmitting the compressed video feed to the central control device to enable the central control device to determine movement of the user within the physical space.

Optionally, the means for compressing and means for transmitting are provided at the display device associated with the user or at a display control device connected to the display device. The display control device may be, for example, a hardware unit connected to the display device and performing the receiving, decompression, transmitting and compression functionalities for the display device.

According to a further aspect, there is provided a method of processing a frame of a video feed, the method comprising defining a plurality of tiles within the frame, determining a measure of complexity for the image data of the tile, determining whether the measure of complexity is above a predetermined threshold, comprising image data for the tile using a first compression algorithm if the measure of complexity is above the predetermined threshold and compressing image data for the tile using a second compression algorithm if the measure of complexity is below the predetermined threshold.

The first and second compression algorithms may be any algorithm described herein. In particular, the first compression algorithm may be an algorithm that preserves edge features while the second compression algorithm may allow a high degree of compression. Determining a measure of complexity includes determining whether edge features are present in the tile.

This further aspect may be provided independently of or in conjunction with the first aspect described above.

There is also described herein a computer program, computer program product or logic encoded on a tangible computer readable medium comprising instructions for implementing the methods as described above.

BRIEF DESCRIPTION OF THE DRAWINGS

Embodiments of the systems and methods described herein are exemplified in the following numbered drawings in which.

EXAMPLE SYSTEM CONFIGURATION

Figure 1:
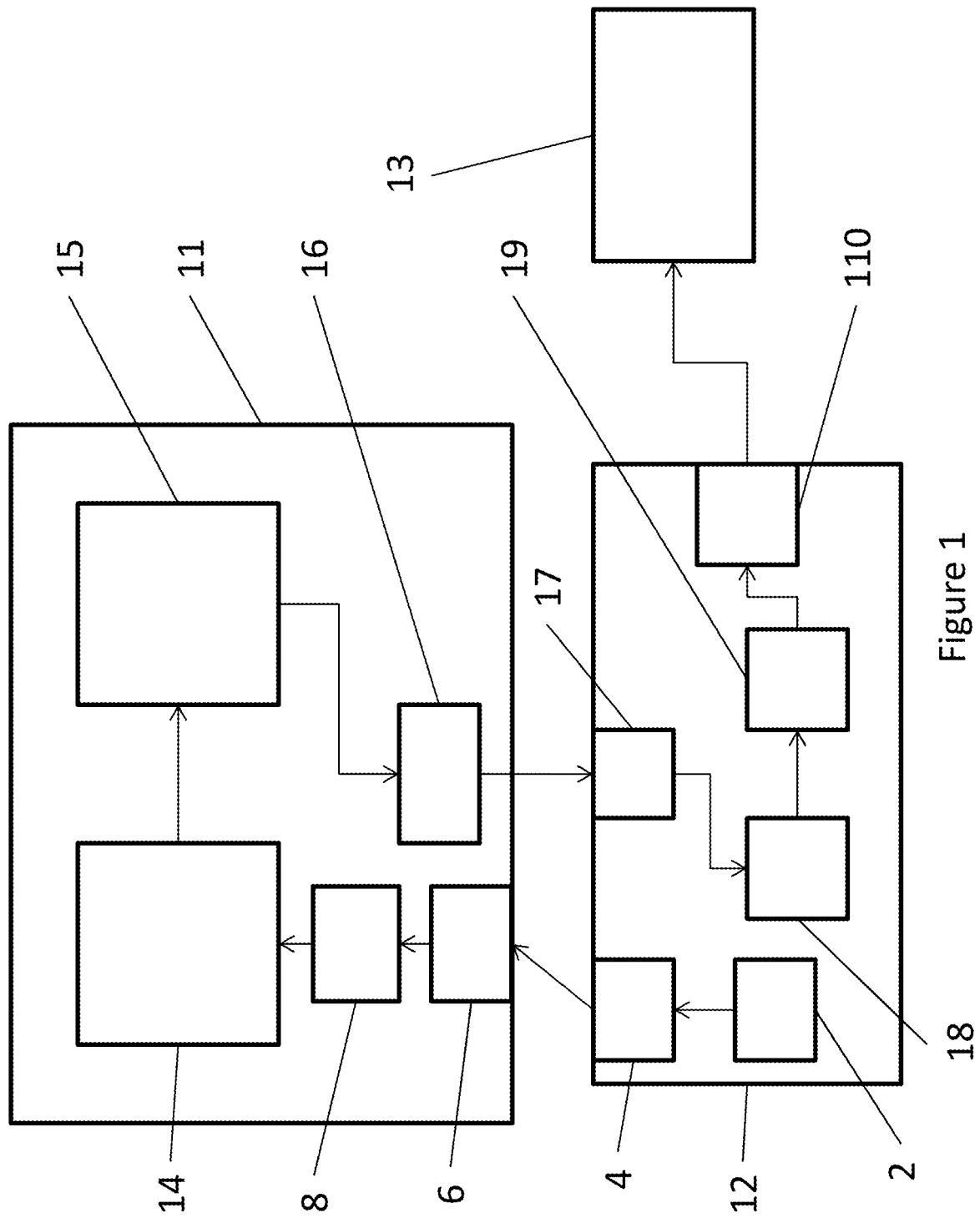
FIG. 1 is a block diagram overview of a system according to one embodiment.

FIG. 1 shows a block diagram overview of a system according to one embodiment. A host computer [11] is connected to a display control device [12], which is in turn connected to a display device [13]. The host [11] contains an application [14], which produces display data. The display data may be produced and sent for compression either as complete frames or as canvasses, which may, for example, be separate application windows. In either case, they are made up of tiles of pixels, where each tile is a geometrically-shaped collection of one or more pixels.

The display data is sent to a compression engine [15], which may comprise software running in a processor or an appropriate hardware engine. The compression engine [15] first performs an encoding of the data, for example using a Haar transformation, to convert the data into a format that may then be further compressed, minimising data loss.

The compression engine [15] may then further compress the data and thereafter sends the compressed data to an output engine [16]. The output engine [16] manages the connection with the display control device [12] and may, for example, include a socket for a cable to be plugged into for a wired connection or a radio transmitter for a wireless connection. In either case, it is connected to a corresponding input engine [17] on the display control device [12].

The input engine [17] is connected to a decompression engine [18]. When it receives compressed data it sends it to the decompression engine [18] or to a memory from which the decompression engine [18] can fetch it according to the operation of a decompression algorithm. In any case, the decompression engine [18] may decompress the data, if necessary, and performs a decoding operation, optionally using a reverse Haar transform. In the illustrated system, the decompressed data is then sent to a scaler [19]. In the case where the display data was produced and compressed as multiple canvasses, it may be composed into a frame at this point.

If scaling is necessary, it is preferable for it to be carried out on a display control device [12] as this minimises the volume of data to be transmitted from the host [11] to the display control device [12], and the scaler [19] operates to convert the received display data to the correct dimensions for display on the display device [13]. In some embodiments, the scaler may be omitted or may be implemented as part of the decompression engine. The data is then sent to an output engine [110] for transmission to the display device [13]. This may include, for example, converting the display data to a display-specific format such as VGA, HDMI, etc.

The display control device [12] also includes a camera [2] for capturing a reverse video feed. The skilled person will appreciate that the camera [2] may be provided integrated with the display control device [12] or the display device [13] depending on the specific system setup. The camera feed, or reverse video feed is fed into a compression and output engine [4], which may be provided as a single integrated unit as illustrated in FIG. 1 or as two separate components.

The reverse camera feed is transmitted to an input engine [6] at the host [11] and from there to a decompression engine [8]. The data is then passed to the application [14] to enable the application to use the data to determine movement of the user within the physical space.

Figure 2:
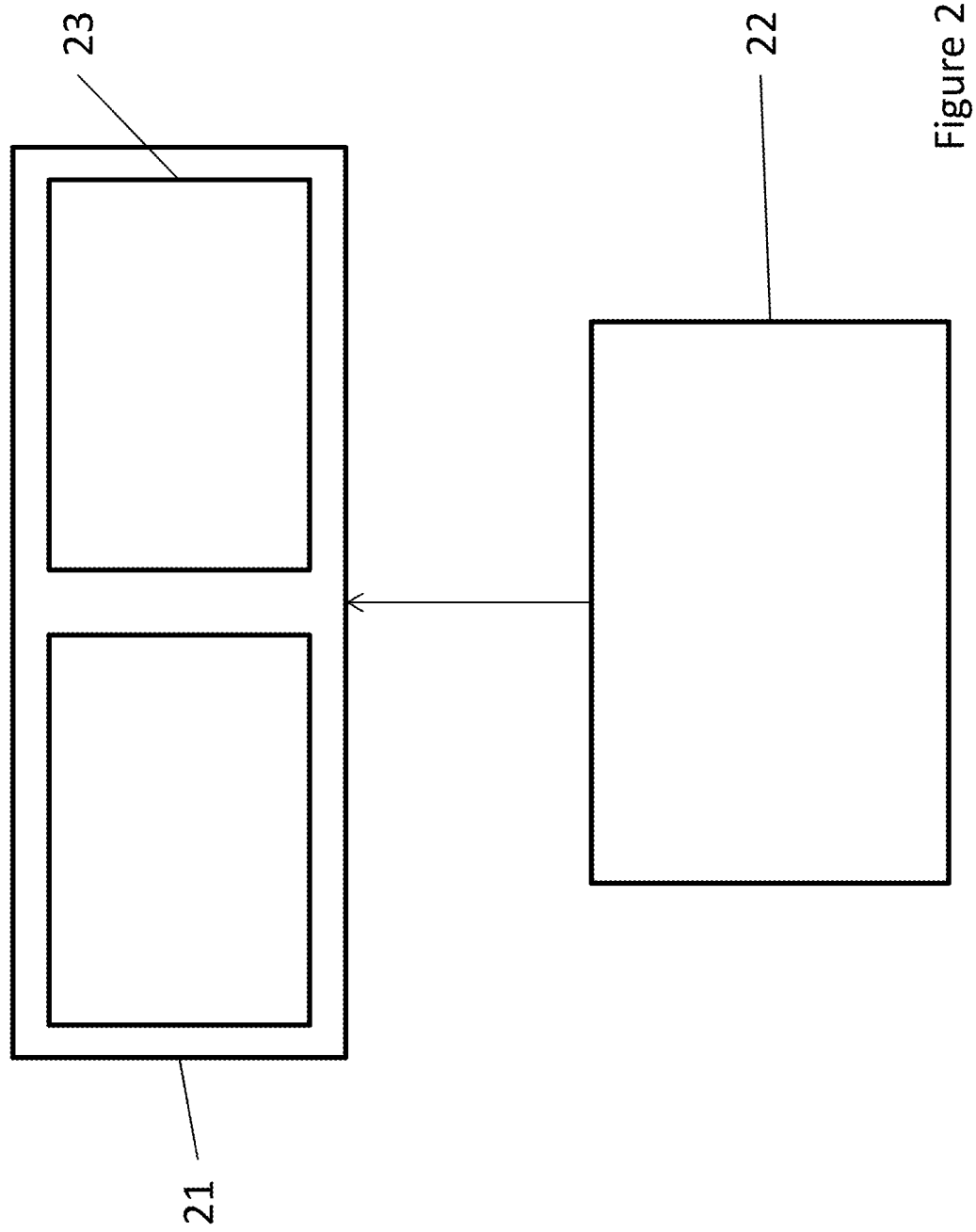
FIG. 2 illustrates a headset or display device for displaying an output to a user according to one embodiment.

In one embodiment, the display device or user display device is a virtual reality headset [21], as illustrated in FIG. 2, connected to a host device [22], or central control device, which may be a computing device, gaming station, etc. The virtual reality headset [21] incorporates two display panels [23], which may be embodied as a single panel split by optical elements. In use, one display is presented to each of a viewer's eyes. The host device [22] generates image data for display on these panels [23] and transmits the image data to the virtual reality headset [21].

In another embodiment, the headset is a set of augmented reality glasses. As in the virtual reality headset [21] described in FIG. 2, there are two display panels, each associated with one of the user's eyes, but in this example the display panels are translucent.

The host device [22] or central control device may be a static computing device such as a computer, gaming console, etc., or may be a mobile computing device such as a smartphone or smartwatch. As previously described, it generates image data and transmits it to the augmented reality glasses or virtual reality headset [21] for display.

The display device may be connected to the host device [11, 22] or display control device [12] if one is present by a wired or wireless connection. While a wired connection minimises latency in transmission of data from the host to the display, wireless connections give the user much greater freedom of movement within range of the wireless connection and are therefore preferable. A balance must be struck between high compression of data, in particular video data, which can be used to enable larger amounts of data (e.g. higher resolution video) to be transmitted between the host and display, and the latency that will be introduced by processing of the data.

Ideally, the end-to-end latency between sensing a user's head movement, generating the pixels in the next frame of the VR scene and streaming the video should be kept below 20 ms, preferably below 10 ms, further preferably below 5 ms.

The wireless link should be implemented as a high bandwidth short-range wireless link, for example at least 1 Gbits/s, preferably at least 2 Gbits/s, preferably at least 3 Gbits/s. An "extremely high frequency (EHF)" radio connection, such as a 60 GHz radio connection is suitable for providing such high-bandwidth connections over short-range links. Such a radio connection can implement the WiFi standard IEEE 802.11ad.

The 71-76, 81-86 and 92-95 GHz bands may also be used in some implementations.

The wireless links described above can provide transmission between the host and the display of more than 50 frames per second, preferably around 60 fps or around 90 fps in other embodiments. In a very high frame rate embodiment, a rate of around 120 fps may be used.

In some embodiments, the headset or other display device uses directional antennae and the display control device uses beamforming techniques in order to focus the signal towards the receiver. While this can increase the transmission bandwidth when the receiver remains static, in a wireless system, and particularly in VR systems designed for the user to move, such techniques can increase the variation in bandwidth available for transmission of the data to the display device.

Figure 3:
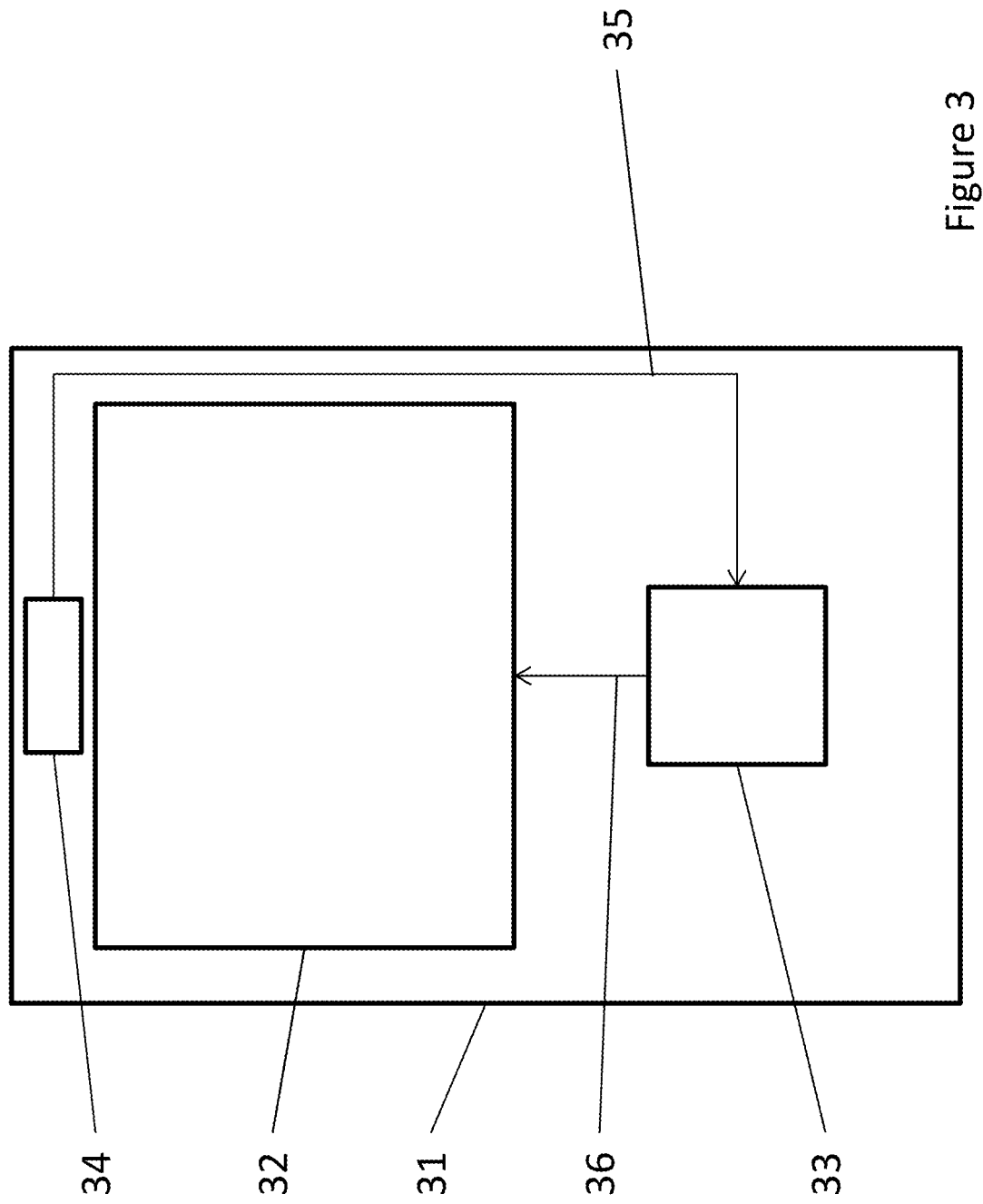
FIG. 3 illustrates a display device according to a further embodiment.

FIG. 3 shows a system which is similar in operation to the embodiment shown in FIG. 2. In this case, however, there is no separate host device [22]. The entire system is contained in a single casing [31], for example in a smartphone or other such mobile computing device. The device contains a processor [33], which generates display data for display on the integral display panel [32]. The mobile computing device may be mounted such that the screen is held in front of the user's eyes as if it were the screen of a virtual reality headset.

Haar Encoding

A Haar transformation processes that may be implemented in conjunction with the present system will now be explained with reference to FIGS. 4 and 5. The Haar encoding is described with reference to the display information transmitted from the display control device to the display device. However, as explained in more detail below, corresponding Haar encoding techniques may also be used prior to transmission of the reverse video feed from the display device to the display control device. As previously mentioned, in the forward direction the Haar transform takes place on the host [11], specifically in the compression engine [15]. Decompression takes place on the display control device [12], specifically in the decompression engine [18], where the data is put through an inverse Haar transform to return it to its original form.

Figure 4:
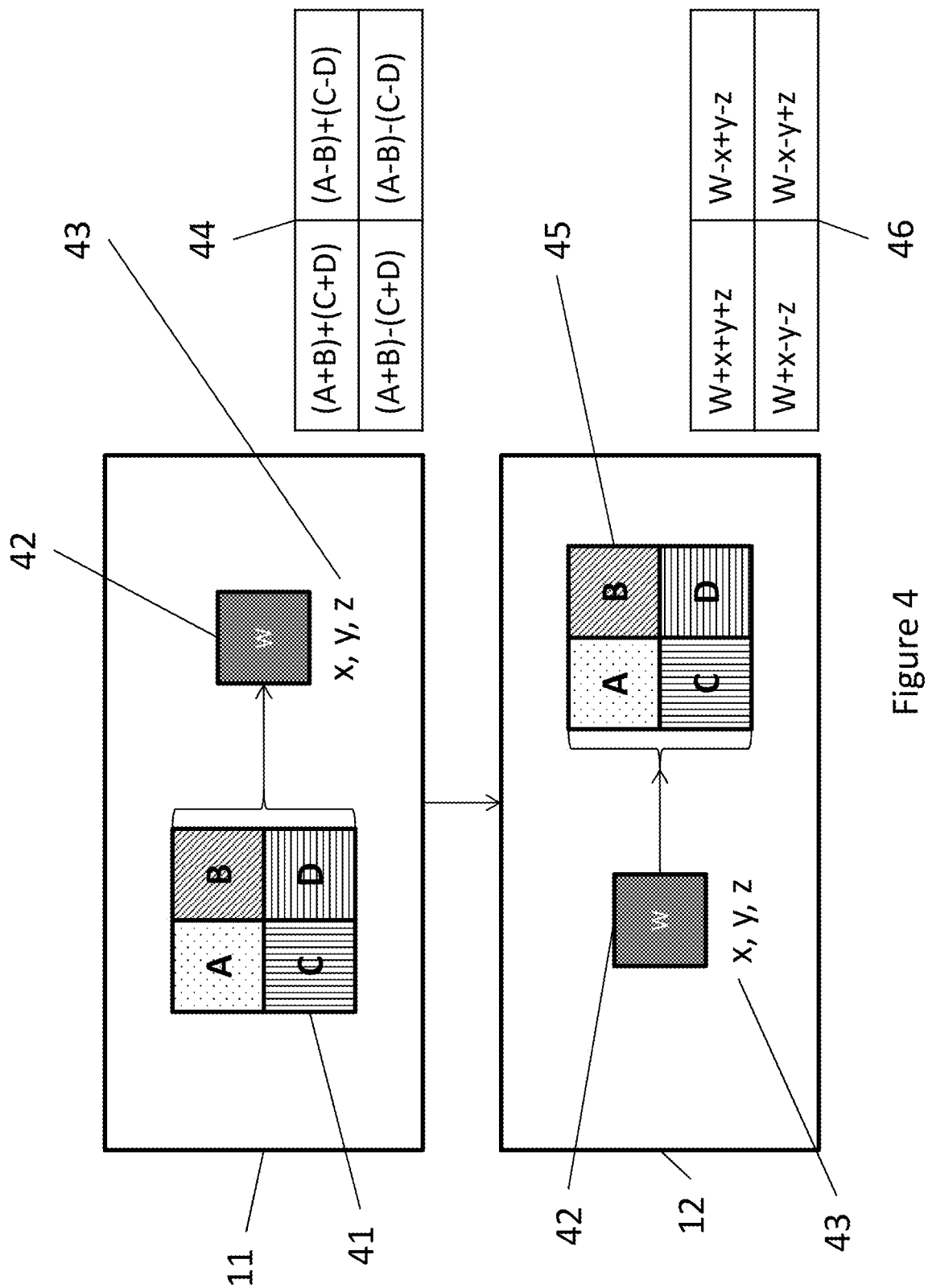
FIG. 4 illustrates a method of Haar encoding according to one embodiment.

In the example shown in FIG. 4, a group of four tiles [41] has been produced by the application [14] and passed to the compression engine [15]. In this example, each tile [41] comprises one pixel, but may be larger. Each pixel [41] has a value indicating its colour, here represented by the pattern of hatching. The first pixel [41A] is marked with dots and considered to have the lightest colour. The second pixel [41B] is marked with diagonal hatching and is considered to have the darkest colour. The third pixel [41C] is marked with vertical hatching and is considered to have a light colour, and the fourth pixel [41D] is marked with horizontal hatching and is considered to have a dark colour. The values of the four pixels [41] are combined using the formulae [44] shown to the right of the Figure to produce a single pixel value [42], referred to as "W", which is shaded in grey to indicate that its value is derived from the original four pixels [41], as well as a set of coefficients [43] referred to in FIG. 4 as "x, y, z". The pixel value [42] is generated from a sum of the values of all four pixels: ((A+B)+(C+D)). The three coefficients [43] are generated using the other three formulae [44] as follows:

x: (A−B)+(C−D)
y: (A+B)−(C+D)
z: (A−B)−(C−D)

Any or all of these values may then be quantised: divided by a constant in order to produce a smaller number which will be less accurate but can be more effectively compressed and rounded.

The reverse transform process is carried out on the single pixel value [42] and coefficients [43] produced in the transform as described above. This process will be carried out after a decompression process, which might involve, for example, multiplying quantised coefficients to restore an approximation of their original values.

The decompression engine [18] combines the coefficients [43] with the value of the pixel value [42] transmitted by the host [11] to recreate the original four pixels [45] using the formulae [46] shown to the right of FIG. 4.

A: W+x+y+z

B: W−x+y−z
C: W+x−y−z
D: W−x−y+z

This is repeated the same number of times that the data was transformed. These pixels [45] are then transmitted to the scaler [19] if a scaler is used.

Figure 5:
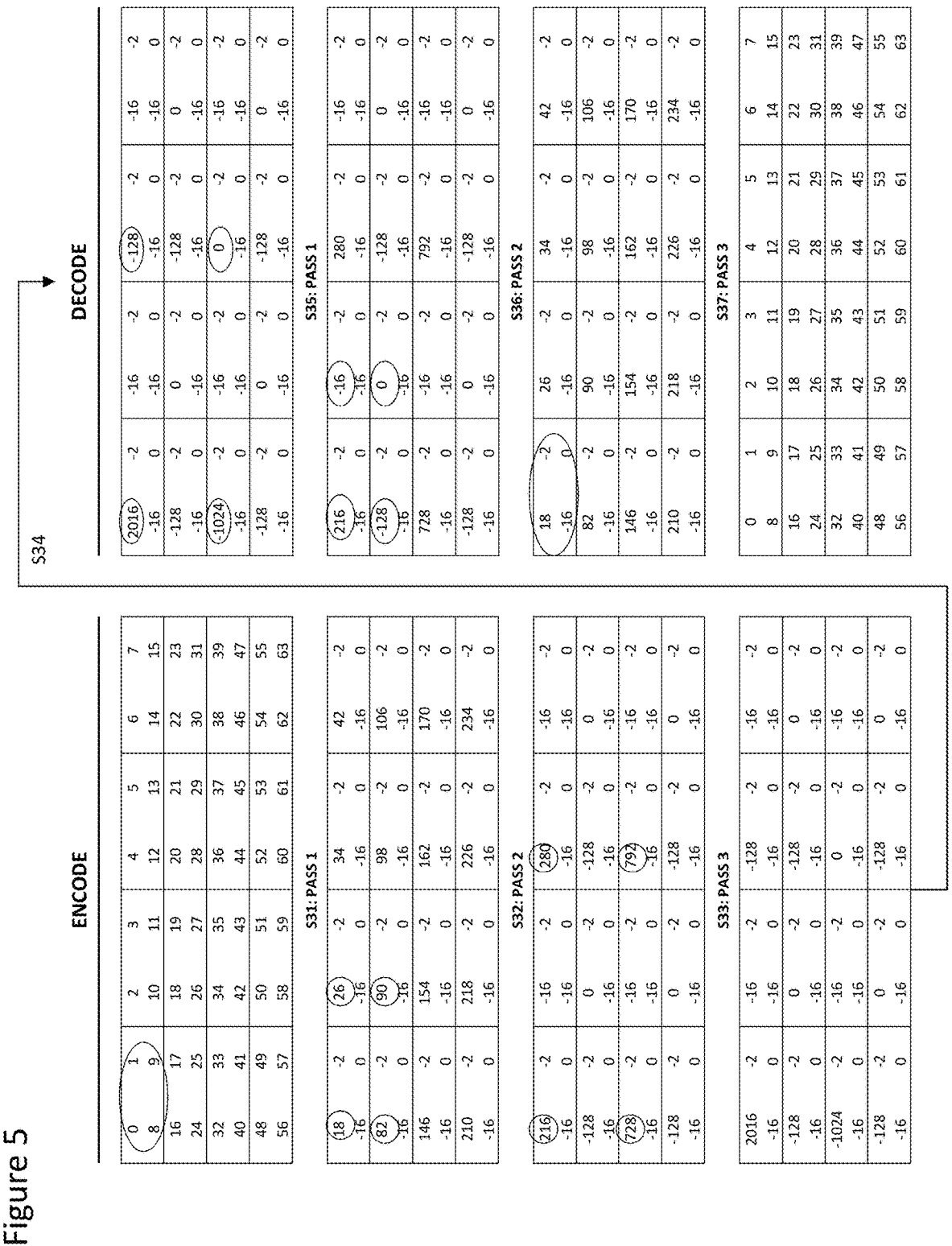
FIG. 5 provides a further illustration of the method of Haar encoding according to one embodiment.

FIG. 5 shows an example of the actual process of a Haar transform. The top part of the encode section shows 64 tiles, each numbered in order from 0. These numbers are used to indicate the values of the tiles as previously mentioned. The tiles are divided into groups of four: for example, the top-left group comprises tiles 0, 1, 8, and 9.

At each pass, the same calculations are performed on a larger range of tile groups to produce combined pixel values and coefficients. In the first pass, Step S31, the tiles in each group are processed using the previously-mentioned formulae [44]. This converts the values in the circled first group to 18, −2, 16, 0 and these values are stored and used in place of the original values. In this example, 18 is the pixel value "W" [42] described in FIG. 4 and −2, −16, and 0 are the coefficients "x", "y", and "z" [43] described in FIG. 4. The same process is carried out on all the groups. These results are shown in the second section of the process, after Step S31.

The second pass, Step S32, applies the same formulae [44] to the top-left tiles in each set of four tile groups. The values to be used in the top-left quarter of the frame in the second pass are shown circled: 18, from the top-left group, 26 from the group to the immediate right, 82 from the group below, and 90 from the final group in the upper-left quarter. The same formulae [44] are then applied to these values to produce 216, −16, −128, and 0, which are put in the places of the original values. Again, these values correspond to W [42], x, y, and z [43] as described in FIG. 4. The same process is carried out on all four quarters, and all other values are unchanged: for example, in the top-left group the three values not used in the second pass of the transform and not circled are unchanged from −2, −16, and 0.

The third pass, Step S33, is carried out on one value from each quarter, as shown circled in FIG. 4: 216 from the top-left quadrant, 280 from the top-right quadrant, 728 from the bottom-left quadrant, and 792 from the bottom-right quadrant. This produces the final results shown at the bottom of the encode section: 2016 (W), −128 (x), −1024 (y), and 0 (z). Once again, all the other values are unchanged.

The values can then be rearranged so that the different coefficients are grouped together. The pixel values at each level are transmitted first, prioritizing the results of later passes, followed by the coefficients. This will result in many small numbers, including many identical numbers: for example, there is a 0 in the same position in each group after the third pass, and these can be grouped and sent as a single number. The values may also be quantised: divided by a constant to produce smaller coefficients and rounded, if desired.

At Step S34, the data is transmitted from the host [11] to the display control device [12], where it is decompressed, de-quantised and re-ordered as appropriate prior to decoding. In this example, these processes produce the same data as was generated by the initial transform, and this table is shown at the beginning of the Decode section. A similar process is then performed to reverse the transform process.

At Step S35, the first pass is performed and the formulae [46] described in FIG. 4 are applied to the circled top-left tile from each quadrant: as mentioned after the third pass of the encode stage, in this pass, and this example, the figures are: 2016 (W [42]), −128 (x [43]), −1024 (y [43]), and 0 (z [43]). This produces a new W value [42] for each quadrant: 216, 280, 728, and 792.

At Step S36, the second pass is carried out. It takes the top-left value from each group in each quadrant (W:216 [42], x: −16, y: −128, z: 0 [43]) and applies the same formulae [46] to them. Finally, the same formulae [46] are applied to every value in each group in the third pass: Step S37. This produces the same values as were input at the beginning of the encode section.

Such a transform is useful because not only does it allow the host [11] to transmit a smaller number of pixels than are present in the full image data, combined with a collection of coefficients, but the coefficients can be compressed more efficiently than pixel data, with less loss of data; they are small numbers and so can be transmitted in fewer bits without any further compression being applied.

Reverse Video Feed Compression

Figure 6:
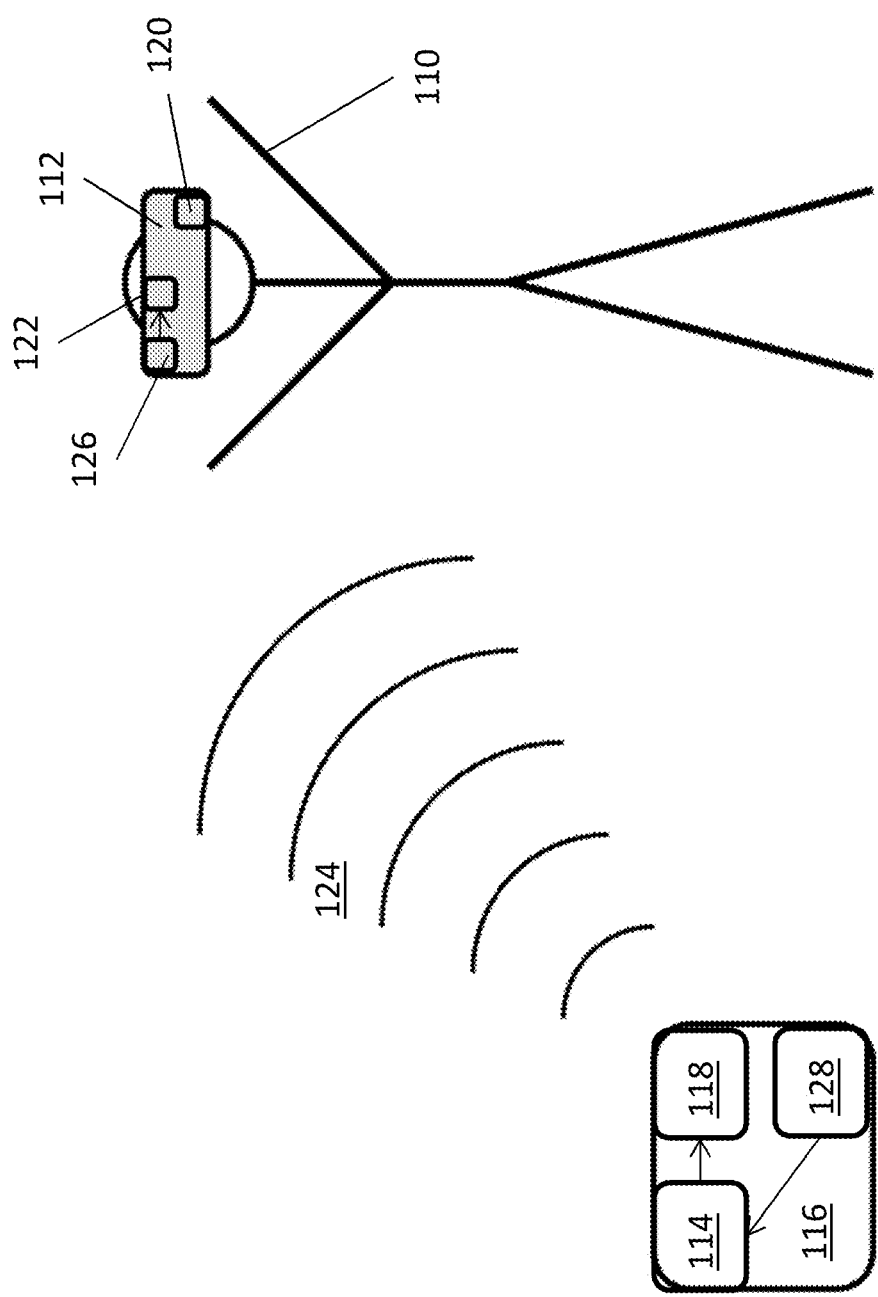
FIG. 6 is a block diagram overview of a further system according to one embodiment.

FIG. 6 is a schematic diagram of a system according to one embodiment in which a user 110 is viewing a video feed on a display device 112, in this case a headset incorporating a screen. The video feed is generated by a Graphics Processing Unit (GPU) 114 in a central control device or unit 116 such as a games console. A compression engine 118 compresses the outgoing video feed from the GPU before sending it, in this case over a short range wireless link 124, to a decompression system 120 associated with the display screen 112.

Simultaneously with delivery of the video feed to the display screen of the user, a camera 126 associated with the user 110, preferably mounted on the user for example on a headband worn by the user or integrated with the user display device, generates a reverse video feed, which is input into a DL3-modified compression engine 122 and transmitted in the reverse direction back over the short range wireless link to a decompression engine 128 at the central control device 116.

The reverse video feed is used by the GPU 114 to determine the position of the user in the physical space occupied by the user and monitor changes in the user's position. This enables the GPU 114 to adapt the video feed sent to the display 112 in order to show the user updated images based on their new position.

In a particular example, as the user 110 turns their head, the reverse video feed will feed back this change in the direction of gaze of the user to the GPU, which can alter the outgoing video feed so that the display 112 shows an image that was previously to the side of the user in the virtual or augmented reality world.

As the inventors have appreciated, a useful reverse video feed needs to track the movement of one or more markers in the field of view. For example, the movement of edges or image features within the reverse video feed such as the edge of a television screen, a window or furniture within the home or office environment can provide a useful indication of movement of the user. Therefore, focusing on marker elements such as these rather than requiring the whole reverse video feed to be received in high quality at the central control device can reduce the amount of bandwidth taken up by the reverse video feed over the link between the central control device and the display device.

One way to focus on the transmission of elements in the reverse video feed that will be useful for tracking movement is to select a compression or encoding technique that highlights these features so that they are not lost in the compression. In one embodiment, a discrete wavelet transform encoding technique or a wavelet-based encoding technique, such as Haar encoding, is used to encode the reverse video feed. Encoding techniques such as this provide an efficient way to encode discontinuous or edge features, at the cost of the encoding of more uniform areas, which is beneficial for the present system.

In another embodiment, compression and encoding techniques that are not optimised to encode discontinuous or edge features are used to encode the reverse video feed and the compression ratio is monitored during the compression process. The compression ratio is a representation of the ratio between the size of the uncompressed image and the size of the compressed image. If the compression ratio is large, a high degree of compression of that part of the image (e.g. image tile) has been achieved; if the compression ratio is low, little compression of that part of the image has been achieved. For a compression technique that is not optimised for edge compression, such as JPEG compression techniques, a low compression ratio is likely to indicate a tile or area of the image that includes an edge or other interesting image feature. Conversely, a high compression ratio is likely to indicate an area of the image that is relatively uniform and does not include interesting edges or image features. Therefore, by monitoring changes in the compression ratio during the compression process, interesting image features that are likely to be useful in motion tracking can be identified.

In some embodiments, only the tiles of the image that contain these interesting image features are transmitted to the central control device. Furthermore, the tiles of the image that are determined to contain potentially useful and interesting image features may be transmitted at a higher resolution or compressed less than tiles that have been determined to be less likely to be of interest. Hence the reverse video feed may comprise select portions of the image that are useful to movement tracking, which are transmitted at a higher resolution but which use less bandwidth overall on the connection between the central control device and the user display device than the uncompressed video feed would use, and in some embodiments less bandwidth than the video feed would take if it had been compressed as a whole.

Figure 7:
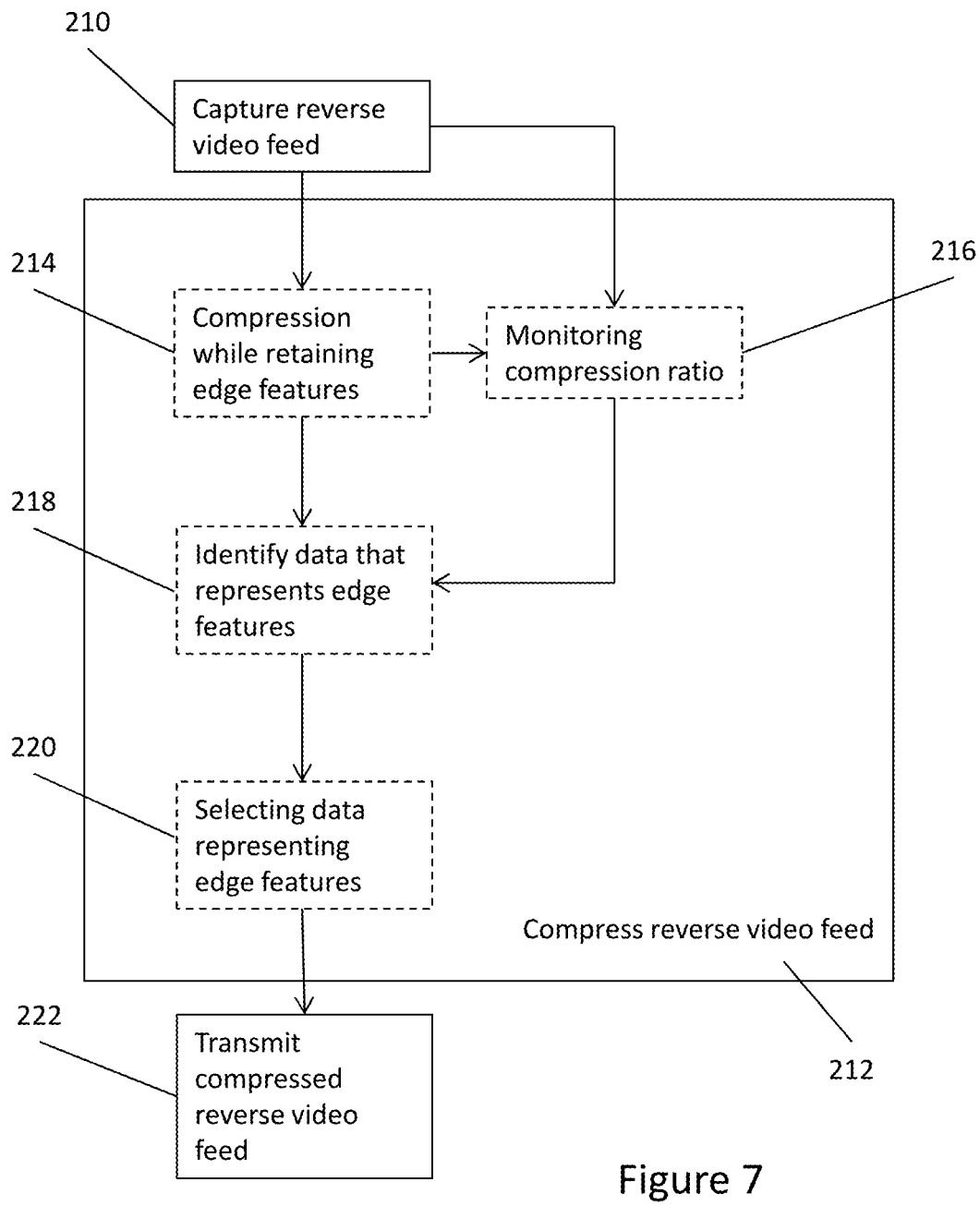
FIG. 7 is a schematic diagram of a method according to one embodiment.

FIG. 7 illustrates a method according to one embodiment with optional steps of the method being illustrated within dashed boxes. In the method illustrated, a reverse video feed is first captured 210 and is then compressed 212.

In one embodiment, the compression technique used retains edge and image features in the reverse video feed 214. Additionally or alternatively, the compression ratio is monitored during compression 216. This can be used to identify data that represents edge features 218. Alternatively, data representing edge features can be identified directly during the compression process, depending on the compression techniques used. Once identified, the data representing edge features can be selected 220. This can enable only the data representing the edge features to be prepared for transmission. Following compression of the reverse video feed 212, the compressed reverse video feed is transmitted to a central system for processing to provide feedback indicating the motion of the user 222.

In summary, in embodiments of the system, although compression may hinder camera feed processing (e.g. by reducing edge detection), it could also help. For example, since edges are difficult for DL3 compression (and result in blurred edges at low quality levels) these features can be detected by noticing when the compression ratio decreases, for a region of pixels, and if the only feature required is edges, the only regions required to send are the ones that are difficult to compress (and may need to be sent with a higher quality to preserve the feature). The decision about which tiles to compress could be made early in the compression process (for example after transforms but before quantisation and entropy encoding), enabling a processing saving if the decision is to discard this region of pixels.

The invention claimed is:

1. A method implemented in a Virtual or Augmented Reality (VR/AR) system comprising a headset worn on a user and a central control device, the method comprising:
   capturing a video feed from a camera of the headset worn on the user, the video feed recording changes in a position of the user in a physical space;
   compressing the video feed from the camera while monitoring changes in a compression ratio as successive tiles of each frame of the video feed are compressed;
   discarding data for tiles for which the compression ratio is greater than a predetermined threshold;
   transmitting the compressed video feed to the central control device; and
   determining, by the central control device, movement of the user within the physical space based on the transmitted compressed video feed.

2. The method of claim 1, wherein compressing the video feed comprises one or more of:
   compressing using a compression technique that does not reduce the definition of edges or image features in the video feed; and/or
   encoding the video feed using a wavelet-based encoding technique or a discrete wavelet transform.

3. The method of claim 1, wherein transmitting the compressed video feed comprises identifying at least one tile in a frame of the video feed that includes an edge or image feature and selectively transmitting the data associated with the at least one tile, and/or wherein transmitting the compressed video feed comprises identifying data representing edges and image features in the video feed and selectively transmitting the identified data.

4. The method of claim 1, further comprising identifying that at least one tile in a frame of the video feed that includes an edge or image feature, storing an identifier of the at least one tile and selectively transmitting the corresponding tile of the next frame of the video feed.

5. The method of claim 1, wherein the video feed is transformed into luminance and chrominance components and wherein compressing the video feed comprises discarding the chrominance components.

6. The method of claim 5, further comprising compressing the luminance component of the video feed.

7. The method of claim 1, further comprising decreasing the level of compression of tiles for which the compression ratio is less than a predetermined threshold, and/or wherein changes in the compression ratio are monitored prior to an entropy encoding step or prior to a quantization step during compressing of the video feed.

8. The method of claim 1, wherein the camera is mounted on the headset such that the field of view of the camera looks away from the user or the field of view of the camera includes the user.

9. The method of claim 1, wherein the video feed from the camera is compressed using a processor of the headset.

10. The method of claim 1, wherein the video feed from the camera is transmitted to the central control device over a two-way communication link, wherein at least a portion of the two-way communication link is also used to transmit VR/AR video data from the central control device to the headset, wherein the headset is configured to display the transmitted VR/AR video data.

11. The method of claim 1, wherein transmitting the compressed video feed comprises transmitting the compressed video feed over a wireless connection between the central control device and the headset.

12. The method of claim 1, further comprising transforming the video feed into a monochrome image, a black and white image, or a greyscale image, prior to compressing the video feed.

13. The method of claim 1, wherein compressing the video feed comprises:
   defining a plurality of tiles within a frame of the video feed;
   determining a measure of complexity for the image data of a tile;
   determining whether the measure of complexity is above a predetermined threshold;
   compressing image data for the tile using a first compression algorithm if the measure of complexity is above the predetermined threshold; and
   compressing image data for the tile using a second compression algorithm if the measure of complexity is below the predetermined threshold.

14. A Virtual or Augmented Reality (VR/AR) system comprising a headset worn by a user and a central control device, the system comprising:
   a camera mounted on the headset and configured for capturing a video feed, the video feed recording changes in a position of the user in a physical space;
   a compression processing module configured for compressing the video feed from the camera and monitoring changes in a compression ratio as successive tiles of each frame of the video feed are compressed;
   discarding data for tiles for which the compression ratio is greater than a predetermined threshold; and
   a transmitter for transmitting the compressed video feed to the central control device to enable the central control device to determine movement of the user within the physical space.

15. The system according to claim 14 wherein the compression processing module and the transmitter are components of the headset.

16. The system of claim 14, wherein the compression processing module is configured to compress the video feed by one or more of:
   compressing using a compression technique that does not reduce the definition of edges or image features in the video feed; and/or
   encoding the video feed using a wavelet-based encoding technique or a discrete wavelet transform.

17. The system of claim 14, wherein the transmitter is configured to transmit the compressed video feed by one or more of:
   identifying at least one tile in a frame of the video feed that includes an edge or image feature and selectively transmitting the data associated with the at least one tile; and/or
   identifying data representing edges and image features in the video feed and selectively transmitting the identified data.

18. The system of claim 14, wherein the video feed is transformed into luminance and chrominance components and wherein the compression processing module compresses the video feed by discarding the chrominance components, and/or by compressing the luminance component of the video feed.

19. A computer program, computer program product or logic encoded on a tangible computer readable medium comprising instructions for implementing a method implemented in a Virtual or Augmented Reality (VR/AR) system comprising a headset worn on a user and a device, the method comprising:
   capturing a video feed from a camera of the headset worn on the user, the video feed recording changes in a position of the user in a physical space;
   compressing the video feed from the camera while monitoring changes in a compression ratio as successive tiles of each frame of the video feed are compressed;
   discarding data for tiles for which the compression ratio is greater than a predetermined threshold;
   transmitting the compressed video feed to the device; and
   determining, by the device, movement of the user within the physical space based on the transmitted compressed video feed.

* * * * *

UNITED STATES PATENT AND TRADEMARK OFFICE
CERTIFICATE OF CORRECTION

| | |
|---|---|
| PATENT NO. | : 11,233,999 B2 |
| APPLICATION NO. | : 16/955613 |
| DATED | : January 25, 2022 |
| INVENTOR(S) | : Richard Akester |

It is certified that error appears in the above-identified patent and that said Letters Patent is hereby corrected as shown below:

In the Specification

In Column 1, Lines 7-13, delete "This application is a National Stage Entry filed under 35 U.S.C. § 371 of PCT/GB2018/053640, filed Dec. 14, 2018, which claims priority to Great Britain Application No. 1721274.7, filed Dec. 19, 2017, all of which are assigned to the assignee hereof. The disclosures of all prior Applications are considered part of and are incorporated by reference in this Patent Application."

Signed and Sealed this
Twenty-fourth Day of May, 2022

Katherine Kelly Vidal
*Director of the United States Patent and Trademark Office*